US012290948B2

(12) United States Patent
Brormann

(10) Patent No.: US 12,290,948 B2
(45) **Date of Patent: *May 6, 2025**

(54) HAIRCUTTER AND HAIRCUTTING BLADE

(71) Applicant: The Calligraphy Cut Company GmbH, Oelde (DE)

(72) Inventor: Frank Brormann, Oelde (DE)

(73) Assignee: The Calligraphy Cut Company GmbH, Oelde (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/985,079

(22) Filed: Nov. 10, 2022

(65) Prior Publication Data

US 2023/0145421 A1 May 11, 2023

Related U.S. Application Data

(60) Continuation of application No. 17/105,428, filed on Nov. 25, 2020, now Pat. No. 11,498,232, which is a (Continued)

(30) Foreign Application Priority Data

Jan. 27, 2010 (DE) ..................... 10 2010 006 030.5
Mar. 30, 2017 (DE) ..................... 10 2017 106 929.1

(51) Int. Cl.
*B26B 21/28* (2006.01)
*B26B 21/10* (2006.01)
(Continued)

(52) U.S. Cl.
CPC .............. *B26B 21/28* (2013.01); *B26B 21/10* (2013.01); *B26B 21/12* (2013.01); *B26B 21/16* (2013.01); *B26B 21/4075* (2013.01)

(58) Field of Classification Search
CPC ..... B26B 21/28; B26B 21/4075; B26B 21/16; B26B 21/12; B26B 21/10
See application file for complete search history.

(56) References Cited

U.S. PATENT DOCUMENTS 967,500 A * 8/1910 Clark ...................... B26B 21/56 76/DIG. 8
969,724 A * 9/1910 Pratt ...................... B26B 21/16 30/527
(Continued)

FOREIGN PATENT DOCUMENTS

DE 266011 C 10/1913
DE 476129 C 5/1929
(Continued)

OTHER PUBLICATIONS

International Search Report of International Application PCT/EP2018/058073, dated Jul. 3, 2018.
(Continued)

*Primary Examiner* — Jonathan G Riley
(74) *Attorney, Agent, or Firm* — R. Dabney Eastham

(57) ABSTRACT

The haircutter according to the invention serves for trimming and styling hair and comprises a grip and a blade head connected with the grip. A working section is disposed at one longitudinal face of the blade head and recessed from an alignment line of the longitudinal face. A haircutting blade having at least one cutting edge is accommodated in the blade head and disposed so as to expose at least part of its cutting edge in the working section and to not protrude beyond the alignment line. The blade head comprises a guiding device having at least one placing surface for the hair to be trimmed so that the hair to be trimmed lies at a defined angle to the cutting edge as the placing surface is placed against the hair.

34 Claims, 6 Drawing Sheets

Related U.S. Application Data continuation of application No. 15/939,291, filed on Mar. 29, 2018, now Pat. No. 10,850,411, which is a continuation-in-part of application No. 14/661,308, filed on Mar. 18, 2015, now Pat. No. 10,464,227, which is a division of application No. 13/522,389, filed as application No. PCT/EP2011/000367 on Jan. 27, 2011, now abandoned.

(51) Int. Cl.
*B26B 21/12* (2006.01)
*B26B 21/16* (2006.01)
*B26B 21/40* (2006.01)

(56) References Cited

U.S. PATENT DOCUMENTS 1,290,641 A * 1/1919 Munroe .................. B26B 21/18 30/84
1,365,176 A * 1/1921 Knudtson ............... B26B 21/10 30/83
1,553,449 A * 9/1925 Kennedy ............... B26B 27/005 30/294
1,666,118 A * 4/1928 Colgrove ................ B26B 5/006 30/169
1,814,596 A * 7/1931 Hamel .................... B26B 5/006 30/286
1,891,627 A * 12/1932 Muros ..................... B26B 21/18 30/73
1,952,370 A * 3/1934 Garretson ............... B26B 21/18 30/72
1,976,290 A * 10/1934 Motley ................... B26B 21/12 30/30
1,987,191 A * 1/1935 Holtzman ............... B26B 21/30 30/61
1,991,289 A * 2/1935 Moses ..................... B26B 21/00 30/53
1,997,992 A * 4/1935 Bates, Jr. ................ B26B 5/006 30/317
2,020,499 A * 11/1935 Garretson ............... B26B 21/32 30/60.5
2,041,564 A * 5/1936 McWilliams ........... B26B 21/18 30/83
2,125,502 A 8/1938 Holtzman
2,254,199 A * 9/1941 Baltuch ................... B26B 5/006 30/289
2,322,744 A * 6/1943 Benjamin ............... B26B 21/56 30/346.61
D159,994 S * 9/1950 Lee .................................. 30/30
2,624,116 A 1/1953 Steinke
2,633,635 A 4/1953 North
2,793,429 A * 5/1957 Barbiera ................. B26B 21/12 30/535
2,853,778 A * 9/1958 Pratt ......................... B44C 7/08 30/294
2,856,683 A 10/1958 Spanel
3,106,020 A * 10/1963 Tape ........................ B26B 21/12 30/55
3,238,616 A * 3/1966 Eweson .................. B26B 21/12 30/30
3,456,340 A * 7/1969 Mondiello .............. B26B 21/10 30/55
3,570,121 A * 3/1971 Graceffo ................. B26B 21/12 30/30
3,772,778 A 11/1973 Ishida et al.
4,037,322 A * 7/1977 Bresler ................. B26B 21/525 30/53
4,631,829 A * 12/1986 Schmidt .................. B26B 5/006 30/294
5,220,728 A * 6/1993 Ueno ...................... B26B 21/12 30/53
5,908,036 A 6/1999 Andrews
6,026,578 A * 2/2000 Brenner ................ B26B 21/523 30/526
6,032,371 A * 3/2000 Chou ........................ B26B 3/00 30/294
6,092,288 A * 7/2000 Adachi ................... B26B 21/10 30/337
6,263,576 B1 * 7/2001 Drapak ................... B26B 21/28 30/48
7,533,595 B2 * 5/2009 Domenico ................ B26B 3/08 30/294
8,191,557 B2 * 6/2012 Saiki ....................... B26B 21/12 132/200
D842,541 S * 3/2019 Brormann ...................... D28/45
D841,886 S 9/2019 Brormann
D858,879 S 9/2019 Brormann
10,464,227 B2 11/2019 Brormann
10,850,411 B2 12/2020 Brormann
2003/0196330 A1 * 10/2003 Kitano .................... B26B 21/10 30/32
2008/0104847 A1 * 5/2008 Veras ...................... B26B 21/28 76/104.1
2009/0032043 A1 * 2/2009 Gaugler ................. A45D 24/10 132/148
2012/0311864 A1 * 12/2012 Brormann ........... B26B 21/4075 30/48
2015/0190937 A1 7/2015 Brormann
2018/0222069 A1 8/2018 Brormann

FOREIGN PATENT DOCUMENTS

DE 1816242 U 8/1960
DE 102010006030 A1 7/2011
DE 102014104821 A1 10/2015
EP 2253436 A1 11/2010
FR 803682 A 10/1936
FR 2849618 A1 7/2004
GB 428589 A 5/1935
GB 469720 A 7/1937
GB 2357057 A 6/2001
WO 199611777 A1 4/1996
WO 2005113203 A1 12/2005
WO 2009125446 A2 10/2009

OTHER PUBLICATIONS

Search report for DE 10 2017 106 929.1, dated Dec. 19, 2017.
International Search Report of International Application PCT/EP2011/000367, dated May 11, 2011.

* cited by examiner

HAIRCUTTER AND HAIRCUTTING BLADE

CROSS-REFERENCE TO RELATED APPLICATIONS

This application is a continuation of the inventor's U.S. non-provisional application Ser. No. 17/105,428 filed on 25 Nov. 2020 and now pending but to be issued as U.S. Pat. No. 11,498,232 on 15 Nov. 2022. U.S. non-provisional application Ser. No. 17/105,428 was a continuation of U.S. non-provisional application Ser. No. 15/939,291 filed on 29 Mar. 2018 and issued as U.S. Pat. No. 10,850,411. U.S. non-provisional application Ser. No. 15/939,291 was a continuation-in-part of the inventor's U.S. non-provisional application Ser. No. 14/661,308 filed on Jul. 9, 2015 and now issued as U.S. Pat. No. 10,464,227. U.S. non-provisional application Ser. No. 14/661,308 was a division of the inventor's U.S. non-provisional application Ser. No. 13/522,389 filed on Jul. 16, 2012 and now abandoned. U.S. non-provisional application Ser. No. 13/522,389 was a 371 of the inventor's PCT/EP2011/000367 filed on Jan. 27, 2011. PCT application PCT/EP2011/000367 claimed priority from the inventor's German application no. DE 10 2010 006 030.5 filed on Jan. 27, 2010. In addition, this application claims priority from the inventor's German application DE 2017 106 929.1 filed on Mar. 30, 2017. The entire disclosures of the PCT application and each of the U.S. applications are incorporated by reference into this application for all purposes allowed by law.

TECHNICAL FIELD

The present invention relates to a haircutter for trimming and styling hair having at least one grip and at least one blade head connected with the grip. The blade head accommodates at least one haircutting blade having at least one cutting edge.

BACKGROUND

Cutting hair on a head by means of a haircutter offers as a rule many advantages over cutting hair by means of scissors. However, handling the haircutter calls for a highly controlled positioning or guiding of the cutter relative to the hair. What is particularly decisive is the angle at which the haircutter is held against the hair during cutting. In practical use, handling a haircutter thus tends to require intense and professional instruction and extensive practice or experience.

The haircutter according to DE 10 2010 006 030 B4 thus provides for an angled orientation of the longitudinal axis of the blade relative to the longitudinal axis of the haircutter. This results in an inclined cut even if the longitudinal axis of the haircutter is held straight relative to the hair.

In practical use it has been observed though that handling this haircutter still requires a high degree of experience or practice for obtaining an optimal cutting result.

It is therefore the object of the present invention to improve the handling of a haircutter and in particular to facilitate it for less skilled users.

SUMMARY

This object is solved by an improved haircutter and by an improved haircutting blade.

The haircutter for trimming and styling hair, in particular hair on a head, has at least one grip and at least one blade head connected with the grip, wherein at least one longitudinal face of the blade head has at least one working section disposed thereat which is recessed from an alignment line of the longitudinal face and wherein at least one haircutting blade having at least one cutting edge can be accommodated in the blade head and disposed so that its cutting edge in the working section is at least partially exposed and does not protrude beyond the alignment line, the blade head comprises at least one guiding device having at least one placing surface for the hair to be trimmed and that the placing surface is at least partially disposed at an angle between 16° and 26° to the plane of the haircutting blade that can be accommodated in the blade head so that the hair to be trimmed lies at a defined angle to the cutting edge as the placing surface is placed against the hair.

The haircutting blade has at least two cutting edges and at least one recess for an adjusting device for aligning the haircutting blade with a blade head, the width of the haircutting blade corresponding at most to half the length of the haircutting blade, and has a rectangular outer contour, with rounded corners.

Further advantages and features can be taken from the general description of the invention and the description of the exemplary embodiments.

The haircutter according to the invention serves for trimming and styling hair, in particular hair on a head, and comprises at least one grip and at least one blade head connected with the grip. At least one longitudinal face of the blade head has at least one working section disposed thereat that is recessed from an alignment line of the longitudinal face. The blade head can accommodate at least one haircutting blade having at least one cutting edge. The haircutting blade can be disposed in the blade head so that its cutting edge in the working section is at least partially exposed and does not protrude beyond the alignment line and preferably is recessed from the alignment line. The blade head comprises at least one guiding device having at least one placing surface for the hair to be trimmed. The placing surface is disposed at least in sections at an angle of more than 12° and in particular less than 30° and preferably less than 26° and particularly preferably at an angle between 16° and 26° relative to the plane of the haircutting blade that can be accommodated in the blade head. This ensures that the hair to be trimmed lies at a defined angle to the cutting edge as the placing surface is placed against the hair.

Preferably the haircutter comprises at least one haircutting blade.

A particularly preferred haircutter is equipped as follows: It serves for trimming and styling hair, in particular hair on a head, and comprises at least one grip and at least one blade head connected with the grip. At least one longitudinal face of the blade head has at least one working section disposed thereat that is recessed from an alignment line of the longitudinal face. The blade head accommodates at least one haircutting blade having at least one cutting edge. The haircutting blade is disposed in the blade head so that its cutting edge in the working section is at least partially exposed and does not protrude beyond the alignment line and preferably is recessed from the alignment line. The blade head comprises at least one guiding device having at least one placing surface for the hair to be trimmed. The placing surface is disposed at least in sections at an angle of more than 12° and in particular less than 30° and preferably maximally 26° to the plane of the haircutting blade accommodated in the blade head. This ensures that the hair to be trimmed lies at a defined angle to the cutting edge as the placing surface is placed against the hair.

The inventive haircutter offers many advantages. A considerable advantage is that the blade head comprises at least one guiding device having at least one placing surface. The placing surface causes the haircutter to be oriented to the plane of the haircutting blade at a particularly advantageous angle to the hair. This provides a defined, optimal cutting angle by simply placing the placing surface of the haircutter on the hair. Thus the inventive haircutter allows achieves a considerably improved trimming result even by users having less than extensive practice or experience.

Another particular advantage is the angle of more than 12° since the hair is thus optimally cut. This angle provides a cut to the hair resulting in more motion and in particular more volume in the hairstyle. Another particular advantage is the angle of less than 30°. The inventive angular range effectively avoids for one, too flat cutting that would thin out the hair and thus obtain a flat hairstyle. For another, too blunt cutting is thus reliably prevented. Also, hair splitting or other undesirable cutting results are reliably inhibited. It is also advantageous that an angle less than that specified by the placing surface cannot be obtained even in case of misuse or in case of an inexperienced person using the haircutter.

At least in the region of the exposed cutting edge in the working section the placing surface is in particular disposed at an angle of more than 12° and in particular less than 30° and preferably maximally 26° to the plane of the haircutting blade accommodated in the blade head. In the working section it is particularly decisive for the hair to be guided at the correct angle. At least in the region of the exposed cutting edge in the working section the placing surface is in particular disposed at the angle provided by the invention to the plane of the haircutting blade accommodated in the blade head. Or else the placing surface may be disposed at least in one other or further region at the angle provided by the invention to the plane of the haircutting blade accommodated in the blade head.

Preferably the placing surface is at least in sections, in particular at least in the region of the exposed cutting edge in the working section, disposed at an angle of substantially 21° and in particular 21° to the plane of the haircutting blade accommodated in the blade head. This angle has been found to be particularly advantageous for styling hair.

The placing surface may at least in sections be disposed at an angle of more than 12°, 13°, 14°, 15°, 16°, 17°, 18°, 19° or 20°. In all the configurations it is preferred for the angle to be larger than or equal to 5°. The placing surface may at least in sections be disposed at an angle of less than 30°, 29°, 28°, 27°, 26°, 25°, 24°, 23° or 22°. These angles have been found to be particularly advantageous in cutting and hairstyling tests. Advantageous configurations may provide for gradations, e.g. of 0.5° or the like.

Particularly preferably the placing surface is at least in sections disposed at an angle between 13° and 29° to the plane of the haircutting blade accommodated in the blade head. The placing surface may at least in sections be disposed at an angle between 14° and 28° and in particular at an angle between 15° and 27° to the plane of the haircutting blade.

In other advantageous configurations the placing surface may at least in sections be disposed at an angle between 16° and 26° and in particular at an angle between 18° and 24° and preferably at an angle between 20° and 22° to the plane of the haircutting blade.

Preferably the placing surface is at least in sections disposed at an angle of 21° showing an angular deviation of +/−1° and preferably +/−0.5° and particularly preferably +/−0.2° to the plane of the haircutting blade. A deviation of +/−2° is also possible and advantageous. The placing surface may in sections be disposed at another angle deviating from this angle. The deviating angle preferably lies between 12° and 30° to the plane of the haircutting blade.

It is preferred for the placing surface and the blade head to be configured integrally. This is in particular understood to mean that the placing surface is incorporated in the blade head. Preferably the placing surface and the blade head show an integral, joined configuration. The placing surface is in particular configured integrally and preferably of one single material with the blade head. The placing surface and the blade head are in particular provided by at least one shared component and in particular by at least one shared cast component. A metallic cast component is particularly preferred.

It is possible to provide two or more placing surfaces. The two or more placing surfaces may be configured integrally and preferably of one single material with the blade head. It is possible for the blade head to comprise, or to be formed by, two or more blade head members. In this case at least one placing surface is preferably integrated in each blade head member. Then at least one placing surface is in particular configured integrally and preferably of one single material with a blade head member. Particularly preferably each blade head member is configured as a metal cast component. The at least one placing surface may be configured separately from the blade head respectively from one blade head member.

The placing surface is in particular provided by a wedge shape and/or convex shape of the blade head. This allows a highly precise while also cost-effective manufacture of the blade head where the required placing surface angle is reliably observed. A cross-section of the blade head is in particular configured in a wedge and/or convex shape. Or else it is possible for the placing surface to be separate from the blade head or to be configured as at least one separate component. The blade head and/or the placing surface may show a two-piece and/or multipart configuration.

In a preferred configuration the blade head comprises two side faces and in particular a front face and a rear face.

In particular at least one placing surface extends on each of the two side faces. These at least two placing surfaces are in particular assigned to one shared working section. This shows the advantage that the left and right sides of the head can be trimmed without requiring the user to walk around the head or turn the haircutter around. The at least two placing surfaces assigned to the shared working section in particular show the same angle to the plane of the haircutting blade accommodated in the blade head.

Preferably at least two placing surfaces are disposed on one side face of the blade head each. The placing surfaces of one side face are assigned to different working sections that are in particular disposed on opposite longitudinal faces of the blade head. The placing surfaces of different side faces are in particular assigned to different working sections that are in particular disposed on opposite longitudinal faces of the blade head. This allows simple rotating or turning the blade head for changing between working sections or between placing surfaces. In particular at least one elevation extends between the at least two placing surfaces disposed on one side face. In particular do the at least two placing surfaces assigned to different working sections show the same angle to the plane of the haircutting blade accommodated in the blade head.

In a particularly advantageous configuration two placing surfaces extend on each of the two side faces. Pairs of placing surfaces each disposed on different side faces are in particular assigned to one shared working section. The two placing surfaces of one side face are assigned to different working sections that are in particular disposed on opposite longitudinal faces of the blade head. Particularly preferably the two placing surfaces of one side face are separated from one another by at least one elevation extending transverse across the blade head. All of the four placing surfaces show in particular a substantially identical configuration in respect of the angle to the plane of the haircutting blade accommodated in the blade head. This haircutter offers particular ease of handling since multiple cutting positions are provided without overloading the cutter with working sections.

In particular at least four placing surfaces are provided for at least two working sections. The working sections and/or the placing surfaces may be identical or else different in configuration. The placing surfaces may for example show different geometries and in particular different angles. The working sections may for example show recesses of different depths and/or different lengths along the longitudinal face of the blade head. Preferably the placing surfaces and working sections are configured in analogy or identically.

Particularly preferably the placing surfaces of a side face are separated from one another by at least one elevation extending in particular transverse and e.g. diagonally across the blade head. This shows the advantage that two placing surfaces or working sections may be disposed on one side face wherein the unused area will not interfere with the hair gliding along the placing surface. Or else the elevation may extend in the longitudinal direction across the blade head. The elevation may extend straight at least in sections and/or curved at least in sections. The elevation is for example configured as a crest.

The width of the haircutting blade preferably corresponds to maximally half the length of the haircutting blade. The width of the haircutting blade is in particular less than 20 mm. This configuration offers many advantages, allowing for example a particularly low-weight blade head since the blade head may be narrow in configuration. This is particularly decisive for a blade head showing a wedge configuration since even a small increase in width of the haircutting blade will considerably increase the total weight of the blade head. Due to the preferred angle of the placing surface to the plane of the haircutting blade a width of less than 20 mm for the haircutting blade has shown to be particularly advantageous.

The width of the haircutting blade is in particular less than 19 mm. A width of less than 18 mm and in particular less than 17 mm is likewise possible. Or else the haircutting blade may show a width of less than 16 mm and in particular less than 15 mm. Or else the haircutting blade may show a width of more than 20 mm and for example more than 21 mm or more than 22 mm or else more than 23 mm. The haircutting blade may also show a width of more than 25 mm or more than 28 mm.

The width to length ratio of the haircutting blade is in particular at least 1:2 and preferably at least 1:2.2 or at least 1:2.25 or particularly preferably at least 1:2.29. Or else the width to length ratio may be at least 1:2.3 or 1:2.4 or at least 1:2.5 or more. Such a width to length ratio allows an ergonomic, particularly low-weight haircutter.

In an advantageous configuration the haircutter comprises at least one adjusting device for aligning the haircutting blade in the blade head. The adjusting device preferably comprises at least one recess in the haircutting blade. The recess shows in particular a closed circumference. The adjusting device preferably comprises at least one adjusting unit in the blade head at least partially engaging the recess. The adjusting device in particular prohibits movability of the haircutting blade at least in the longitudinal direction and/or at least transverse to the longitudinal direction. The haircutting blade in particular form-fittingly surrounds the adjusting unit at least in sections. The haircutting blade for example bears against the adjusting unit with its recess in the longitudinal direction and/or transverse to the longitudinal direction. Thus the blade can be aligned with high precision while involving little complexity and reliably preventing an undesirable play of the blade during cutting. This adjusting device moreover enables fast and smooth blade changes.

The recess in the haircutting blade is preferably configured as at least one elongated hole. The elongated hole extends in particular in the longitudinal direction of the haircutting blade. The elongated hole is in particular rectangular in configuration. The elongated hole shows in particular a closed circumference. This recess configuration provides for particularly economic manufacture while also offering precision and reliability for aligning the haircutting blade in the blade head. The recess is in particular disposed centrally in the haircutting blade. Or else, other geometric recess shapes and/or other recess orientations in the haircutting blade are possible. The recess may comprise sections showing different widths and/or lengths and/or a curved and/or polygonal shape. Or else, two or more recesses and in particular two or more elongated holes may be provided.

The recess extends in particular over more than half and preferably over more than three quarters and particularly preferably more than 80% of the length of the haircutting blade.

It is preferred for the recess, in particular the elongated hole, to show a length of more than two thirds of the length of the haircutting blade. It is likewise preferred for the recess, in particular the elongated hole, to show a width of less than one third of the width of the haircutting blade. Preferably the recess, in particular the elongated hole, shows a width of more than 20% of the width of the haircutting blade. This ensues in a reliable orientation while not detrimentally weakening the haircutting blade. The recess may be shorter and/or wider or narrower in configuration.

The adjusting unit comprises in particular at least two and preferably at least three elevations. In particular at least two elevations are disposed at the ends of the elongated hole. In particular at least one elevation is disposed in-between. This will reliably prevent blade movement so as to further improve the cutting result. The elevations extend at least partially through the recess.

The adjusting device comprises in particular at least one take-up cavity disposed in the blade head. The take-up cavity traces an outer contour of the haircutting blade at least in sections. The take-up cavity is in particular rectangular at least in sections so that it can trace a rectangular outer contour of the haircutting blade. Due to the outer contour this take-up cavity offers a firm seat and particularly close fit of the haircutting blade while its manufacture is particularly low-cost.

In a preferred configuration the blade head has at least two blade head members. The blade head comprises in particular at least one first blade head member and at least one second blade head member that can be detachably coupled therewith. The haircutting blade can in particular be accommodated between the blade head members.

At least one connecting lug protrudes in particular from each of the blade head members. The connecting lug is in particular configured conically at least in sections. The connecting lug of the first blade head member can in particular be pushed beneath the connecting lug of the second blade head member and vice versa so that the connecting lugs can be wedged to one another and the haircutting blade can be clamped between the blade head members. The connecting lugs can in particular be wedged to one another and preferably wedged self-lockingly. This blade head configuration offers a particularly tight and firm clamping of the haircutting blade so as to reliably avoid vibrations and movements of the haircutting blade. This will achieve particularly good cutting results.

Other connecting devices or other connection types are likewise possible. For example the blade head members may be connected via at least one lug engaging with at least one undercut. Or else the blade head members may be pivotally attached to one another via at least one hinge or the like.

In particular the first and/or second blade head member is provided with at least one grip accommodation for fastening the grip to the blade head. The at least one working section is in particular disposed in at least one blade head member and particularly preferably in both of the blade head members. In particular both of the blade head members show at least one worked-in recess each. The recesses in the two blade head members combined serve in particular for at least one shared working section. Both the blade head members show in particular the same recess relative to the alignment line of the longitudinal face. Both the blade head members show in particular the same width for the two blade head members to rest flush against the longitudinal face of the blade head.

At least one blade head member and preferably both the blade head members are in particular equipped with at least one placing surface each and preferably two placing surfaces each. The placing surfaces of one blade head member are in particular incorporated therein and joined therewith preferably integrally, in particular made of one single material. The placing surfaces of a blade head member may be configured separately.

Preferably at least one blade head member and preferably both the blade head members are equipped with at least one working section and preferably with two working sections each. Every working section provided is in particular provided with at least one placing surface on each of the blade head members.

The adjusting unit is in particular disposed on the first and/or second blade head member. In a region of the other of the blade head members opposite the adjusting unit at least one recess is in particular disposed that accommodates the adjusting unit when the blade head members are installed.

At least one connecting lug and preferably both the connecting lugs extend in particular at least partially through the recess in the haircutting blade. This achieves a particularly compact blade head. This arrangement is given in particular when the blade head members are operationally coupled to one another. Then preferably at least one connecting lug and particularly preferably both the connecting lugs provide at least one adjusting unit for aligning the haircutting blade. This is particularly advantageous since the connecting lugs can thus at the same time be used for aligning the haircutting blade. In particular the width of the connecting lug is matched to the width of the recess so as to allow close-fit placement.

It is possible for the first blade head member to have at least one cutout on its side face. At least one projection of the second blade head member in particular engages in the cutout. It is also possible for the cutout to be disposed in the second blade head member and the projection, in the first blade head member. This offers particularly tight clamping of the haircutting blade. The projection is retained in the cutout in particular by at least one spring member. The projection may show at least one lug and/or undercut that engages in particular in at least one undercut and/or lug in the cutout. The side face of the blade head member is disposed in particular transverse to the longitudinal face having the working section. The cutout is in particular disposed in the side face adjacent to the grip respectively the grip accommodation.

In all the configurations it is preferred for the cutting edge of the haircutting blade to be disposed at an angle between 0.5° and 6° to the longitudinal axis of the blade head. This angle is present in particular when the haircutting blade is operationally accommodated in the blade head. Preferably an angle between 2° and 4° is provided. Particularly preferably an angle of 3°+/−0.5° is provided. Or else the angle may be 0.1° to 10°. Or else a parallel arrangement of the cutting edge to the longitudinal axis of the blade head is conceivable. Such an inclined position of the cutting edge shows the advantage of further improving the cutting result.

To this end the adjusting unit is particularly preferably disposed at such an angle to the longitudinal axis of the blade head. This shows the advantage that the adjusting device can already specify the desired inclined position. The inclined position of the cutting edge may also be achieved by an angular arrangement of the recess in the haircutting blade relative to the cutting edge of the haircutting blade. The angle for the inclined position may also be achieved by way of a combination of an angular arrangement of the adjusting unit and the recess together. Also, the recess in the haircutting blade may be disposed at such an angle to the longitudinal axis of the blade head.

It is possible for a line segment extending orthogonally to the alignment line of the longitudinal face to show an angle of 12° to 23° to the plane of the haircutting blade between a valley point in which the working section is recessed furthest and where the placing surface lies deepest above the haircutting blade, and a peak point in which the placing surface lies highest above the haircutting blade. Preferably an angle of 16° to 18° and particularly preferably 17° is provided. An angle of 21° is also advantageous and preferred. It is also possible to provide an angle of at least 13° and maximally 29° for the line segment. This configuration shows the advantage of achieving good cutting results while simultaneously allowing a highly versatile configuration of the placing surface between the valley point and the peak point. The peak point lies in particular on the elevation.

The placing surface shows in particular an angle of 12° to 30°, in particular 20° to 22°, to the plane of the haircutting blade at least in sections between the valley point and the peak point. The placing surface may show an angle of 16° to 26°, in particular 18° to 24°, to the plane of the haircutting blade at least in sections between the valley point and the peak point. Other angles are likewise conceivable.

Preferably the placing surface extends at least at two different angles between the valley point and the peak point, in particular along the line segment. The at least two angles lie in particular between 12° and 30°. The angles are preferably configured as described above. The angles may be provided by means of a curved shape of the placing surface. The placing surface may also be straight.

The placing surface may for example extend between the valley point and the peak point at different angles or in a convex or bent shape. For example the placing surface may, starting out from the peak point, first show an angle of 20° to 22° to then make a transition to at least a flatter angle of for example 12° to 19°.

In an advantageous specific embodiment the placing surface has at least one first placing section and following behind, at least one second placing section transverse to the longitudinal axis. The first placing section is disposed in particular closer to the exposed cutting edge than is the second placing section. The first placing section shows in particular a larger angle than does the second placing section to the plane of the haircutting blade. This division of the placing surface provides for a particularly controlled orientation of the hair relative to the cutting edge. The first placing section allows specifying a particularly favorable cutting angle. A flatter configuration of the second placing section allows to configure the blade head considerably narrower and thus more lightweight and ergonomically better. Or else it is possible for the first placing section to show a smaller angle than does the second placing section.

The first placing section shows in particular an angle of 15° to 29° and preferably 19° to 23°. The second placing section shows in particular an angle of 12° or 13° to 15° or 18°. Particularly preferably the second placing section shows an angle of 12° to 15°. The first placing section preferably shows an angle of 21°+/−1° and particularly preferably 21°. The second placing section shows in particular an angle of 14° to 16° or to 18°. The angle may be 17° or 18°. The second placing section preferably shows an angle of 15°+/−1° and particularly preferably 15°. These angles for the first and/or second placing sections allow particularly smooth and clean cuts while also offering improved ergonomics of the haircutter.

Preferably the first placing section extends over less than half the width of the placing surface. Preferably the second placing section extends over more than half the width of the placing surface. The first placing section in particular extends over less than one third of the width of the placing surface and the second placing section, over more than two thirds of the width of the placing surface. These extensions of the placing sections offer particularly good trimming results, allowing the blade head to glide very smoothly on the hair. It is possible for the second placing section to extend in the longitudinal direction at least on one side next to the working section up to a side face of the blade head.

It is possible for the first placing section and/or the second placing section to show a dome-like shape at least in sections, in particular at least in the region of the exposed cutting edge in the working section. Thus the hair comes to be particularly well placed against and guided along the blade head. In particular the first and/or second placing section show a concave doming so that at least one dip ensues in the side face. Or else a convex doming is possible so that at least one elevation ensues on the side face. It is also possible for the first and/or second placing section to show a bent shape at least in sections. The bend may be disposed transverse to the longitudinal direction and/or in the longitudinal direction of the blade head. The first and/or second placing section may also be plane or straight in shape.

It is possible to dispose at least one third placing section at least on one side in the longitudinal direction adjacent to the working section. The third placing section extends in particular at least in sections between an elevation on the blade head extending substantially diagonally and a section of the longitudinal face of the blade head in which the longitudinal face shows increasing thickness. The elevation in particular separates from one another two working sections that are disposed on opposite longitudinal faces of the blade head. Such a placing section allows particular ease of disposing two working sections on opposite longitudinal faces of the blade head without impeding the placement of the hair against the blade head. The third placing section in particular shows an angle to the plane of the haircutting blade between 12° and 30°. The angle of the third placing section may be smaller or equal to the angle of the first and/or second placing section. It is also possible for the angle of the third placing section to be larger than the angle of the first and/or second placing section.

Preferably the blade head has at least one take-up surface for the haircutting blade. In particular more than one fourth of at least one of the side faces of the haircutting blade rests against the take-up surface. It is also possible for the haircutting blade to rest against a plurality of contact points on the take-up surface. Such a take-up surface reliably prevents blade vibrations or movements during cutting. Particularly preferably more than one fourth of both side faces of the haircutting blade rests against the take-up surface.

The blade head shows in particular at least one depression that is recessed from at least one of the side faces of the haircutting blade so as to expose the side face of the haircutting blade in this spot. This allows a particularly advantageous weight reduction of the blade head. This is a particular advantage for blade heads of a metal material. Preferably at least one depression each and/or at least one take-up surface each is provided in both the blade head members. The take-up surface and the depression are in particular disposed opposite one another on a blade head member.

The take-up surface is in particular disposed adjacent to the working section. The depression is in particular disposed spaced apart from the working section. This shows the advantage of particularly firmly accommodating the blade where it is stressed during cutting hair.

It is preferred for a longitudinal axis of the grip to extend on one plane with the haircutting blade. This provides for the haircutter to be particularly well balanced out and ergonomic. This arrangement refers in particular to an operational state of the haircutter with the haircutting blade accommodated. For example the haircutter simply needs to be turned about 180° for changing from one working section to the opposite working section. The cutting edge of the haircutting blade preferably lies at an angle to the longitudinal axis of the grip. Or else the cutting edge may be aligned parallel to the longitudinal axis of the grip.

The working section in particular shows a length that is shorter than half the longitudinal face of the blade head. In particular the length of the working section is shorter than one third or preferably one fourth of the length of the longitudinal face. The length of the working section may be shorter than one fifth or one sixth of the length of the longitudinal face.

The width of the working section, starting out from the alignment line of the blade head blade body, is in particular less than half and preferably less than one fourth of the width of the blade head. The width of the working section may be less than one fifth or less than one eighth of the width of the blade head. Or else a broader or flatter working section is possible.

The working section is in particular disposed in a third and preferably in a fourth of the longitudinal face located at one end of the longitudinal face. A central arrangement of the working section along the longitudinal face is also possible.

Preferably the grip and the blade head show at least one shared balancing point. The balancing point is in particular disposed in the grip. The balancing point is in particular understood to mean that the haircutter is preferably in equilibrium as it rests in the balancing point. This offers particularly precise handling. The haircutter can thus be guided very precisely and for a prolonged time without tiring the hand. Thus the blade head may be sufficiently heavy to allow secure and fast trimming. The balancing point in the grip balances the haircutter out optimally despite the weight of the blade head so that it will not turn top-heavy.

The balancing point is in particular disposed in a half adjacent to the blade head and preferably in a third of the grip adjacent to the blade head. The balancing point may also be disposed in the blade head.

Preferably at least one counterweight can be accommodated in the grip and/or in the blade head. This offers many advantages. Thus the user can optimally balance out his haircutter and, e.g., set an intended top-heaviness or define a balancing point. The blade head may for example be set to a minimum weight that allows an energetic, vigorous cut. Users having small hands may reduce the weight by removing one or more counterweights.

The haircutter comprises in particular at least one counterweight. Two or more counterweights may be comprised. The counterweight is, or comprises, e.g. at least one lead weight. This provides high weight combined with small dimensions. Other materials are likewise conceivable. The counterweight can in particular be inserted and e.g. screwed into the grip and/or blade head. The grip and/or the blade head are in particular configured hollow at least in sections. The grip and/or the blade head may comprise an at least partially enclosed cavity that can accommodate the counterweight. The cavity can preferably be closed. The counterweight can be accommodated in particular between the two blade head members.

It is possible for the grip and the blade head to show substantially the same and in particular identical weights. The grip and the blade head show in particular the same weight at a deviation of +/−5 g and preferably +/−1 g. The deviation from one another is in particular less than 25% and preferably less than 15% and particularly preferably less than 10%. The deviation may be larger. Using the at least one counterweight allows in particular to set a weight difference matched to the user. A weight difference of for example up to 50% or else up to 100% or more than 100% may be set by means of the counterweight.

For example the grip weighs 40 g+/−5 g and the blade head weighs 40 g+/−5 g. In addition to these weights at least one counterweight can be received and/or removed.

The haircutting blade according to the invention is in particular provided for a haircutter according to the disclosure. The haircutting blade comprises at least one cutting edge and preferably at least two cutting edges and at least one recess for an adjusting device for aligning the haircutting blade in a blade head. The width of the haircutting blade corresponds to maximally half the length of the haircutting blade.

This width to length ratio allows particular ease of inserting the inventive haircutting blade into a blade head having an angular placing surface and preferably into the inventive haircutter.

The haircutting blade is in particular configured as it has been described with reference to the haircutter.

Preferably the haircutting blade shows a rectangular outer contour, in particular with rounded corners. This shape allows manufacturing the blade and a take-up cavity provided therefor in the blade head with particular dimensional consistency and also cost-effectively. This provides accommodation of the blade in the blade head with particularly little play. The corners provided may also be rectangular or non-rounded.

The recess is particularly preferably configured as a rectangular elongated hole. The rectangular elongated hole has in particular rectangular corners preferably with non-rounded corners. This provides for a secure seat and close fit on the adjusting unit. The adjusting unit is in particular also configured with matching, rectangular corners or edges.

It is preferred for the recess to extend over more than 20% of the width of the haircutting blade. It is also preferred for the recess to extend over more than 75% of the length of the haircutting blade. Preferably the recess extends over more than 25% of the width and/or over more than 85% of the length. This offers a particularly firm seat of the haircutting blade in the blade head respectively on the adjusting unit. Moreover this recess allows particularly economic manufacturing of the adjusting unit required therefor, including high-precision close fit.

All the provided working sections in particular provide for one single shared haircutting blade. The haircutting blade is for example equipped with two opposite cutting edges to provide opposite working sections with one cutting edge each. The haircutting blade shows in particular at least two cutting edges, in particular on its longitudinal faces.

The particulars regarding angles may relate to medium angles. This is in particular the case in configurations where the placing surface comprises two or more placing sections and/or shows a domed or curved shape. The medium angle refers for example to a line segment between a valley point and a peak point.

The grip in particular comprises, or is configured as, an elongated shaft.

Further advantages and features of the present invention can be taken from the exemplary embodiments, which will be discussed below with reference to the enclosed figures.

DETAILED DESCRIPTION

Figure 1:
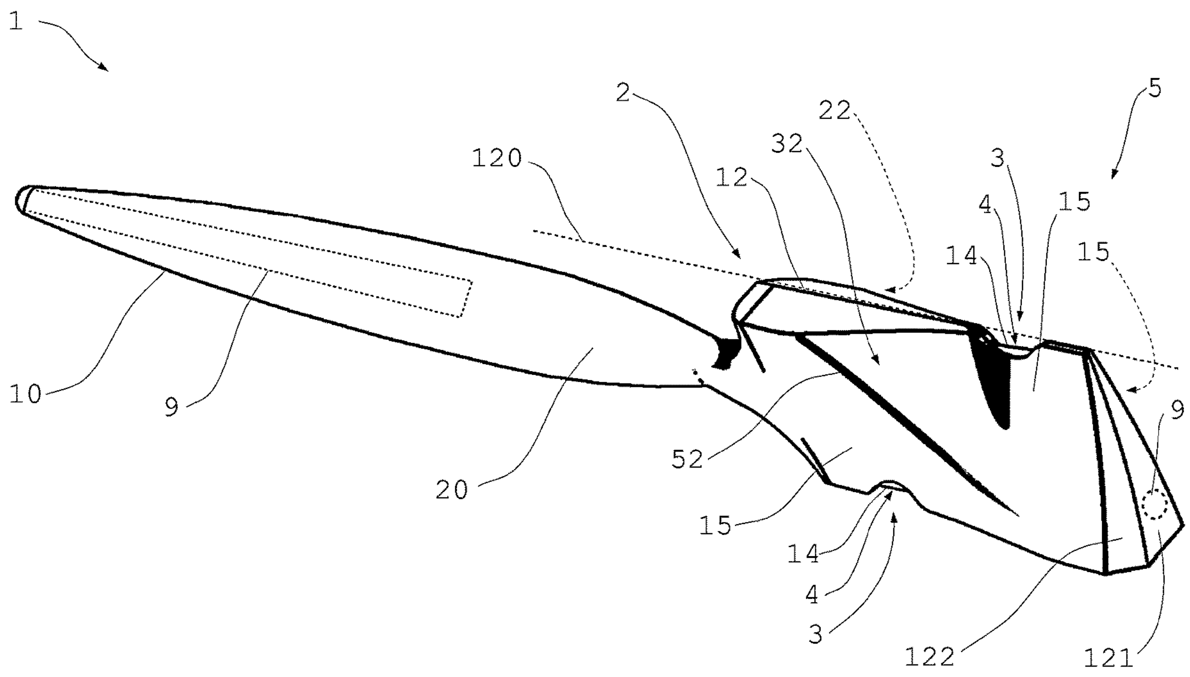
FIG. 1 is a schematic illustration of a haircutter according to the invention in a perspective view.

FIG. 1 shows a haircutter 1 according to the invention having a blade head 2 and accommodated therein, a haircutting blade 4. A grip 10 is attached to the blade head 2 so that the longitudinal axes of the grip 10 and the blade head 2 are oriented in the same direction.

This blade head 2 comprises two opposite working sections 3 offset to one another that are recessed relative to an alignment line 120 of a longitudinal face 12. This haircutting blade 4 comprises two opposite cutting edges 14 each of which is accessible in one working section 3 only. The working sections 3 are configured as recesses.

The blade head 2 comprises two blade head members 121, 122 between which the haircutting blade 4 is accommodated. The first blade head member 121 is connected with the grip 10. The second blade head member 122 is attached to the first blade head member 121 for which it serves as a cover. The two blade head members 121, 122 rest flush against the longitudinal faces 12.

Each of the blade head members 121, 122 provides a side face 22, 32 of the blade head 2. Each of the side faces 22, 32 shows a substantially diagonal elevation 52 that separates the two opposite working sections 3 from one another.

The blade head 2 comprises a guiding device 5 that guides the hair during cutting at a defined angle along the blade head 2. The guiding device 5 provides two placing surfaces 15 for each of the working sections 3. Thus, each of the working sections 3 is provided with one placing surface 15 on each of the side faces 22, 32. The placing surfaces 15 on the side face 22 are not visible in this illustration.

The two placing surfaces 15 disposed on one shared side face 22, 32 are separated from one another by the elevation 52.

The guiding device 5 is configured integrally with the blade head 2. Thus result the placing surfaces 15 from a wedge-shaped design of the blade head 2 or its blade head members 121, 122.

The grip 10 and the blade head 2 show one shared balancing point 20 disposed in the grip 10. The grip 10 is provided with a hollow space that can accommodate a counterweight 9. This is for example a lead weight 9 having such a weight as to obtain a grip 10 having the same weight as does the blade head 2. Then the haircutter 1 is in equilibrium or in a level position as it rests on the balancing point 20.

Figure 2:
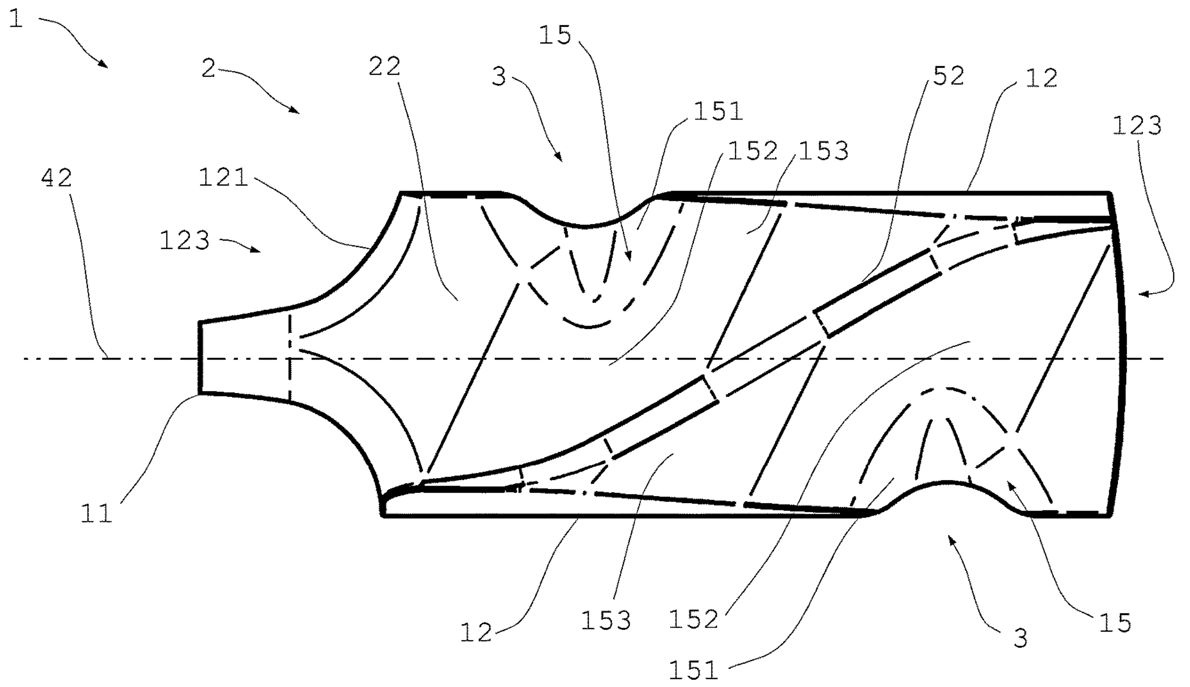
FIG. 2 is a schematic illustration of a blade head member of the haircutter in a view of a side face.

FIG. 2 illustrates the first blade head member 121 in a view of the side face 22. The longitudinal axis 42 of the blade head 2 is inserted as a dash-dotted line. The side faces 123 extend transverse to the longitudinal axis 42. The grip accommodation 11 is disposed on one of the side faces 123.

The placing surfaces 15 each comprise three placing sections 151, 152, 153. The first placing section 151 is disposed in the region of the working section 3. The second placing section 152 is located behind, transverse to the longitudinal axis 42. The third placing section 153 is disposed in the direction of the longitudinal axis 42 laterally adjacent to the two placing sections 151, 152. The thickness of the blade head member 121 increases along the longitudinal face 12 in the region of the third placing section 153.

The first placing section 151 is concave, dome-like, so as to provide a dip in the region of the working section 3. The first placing section 151 shows a larger angle to the plane of the haircutting blade 4, which is not shown, than does the second placing section 152. The first placing section 151 extends over less than half the width of the entire placing surface 15.

Figure 3:
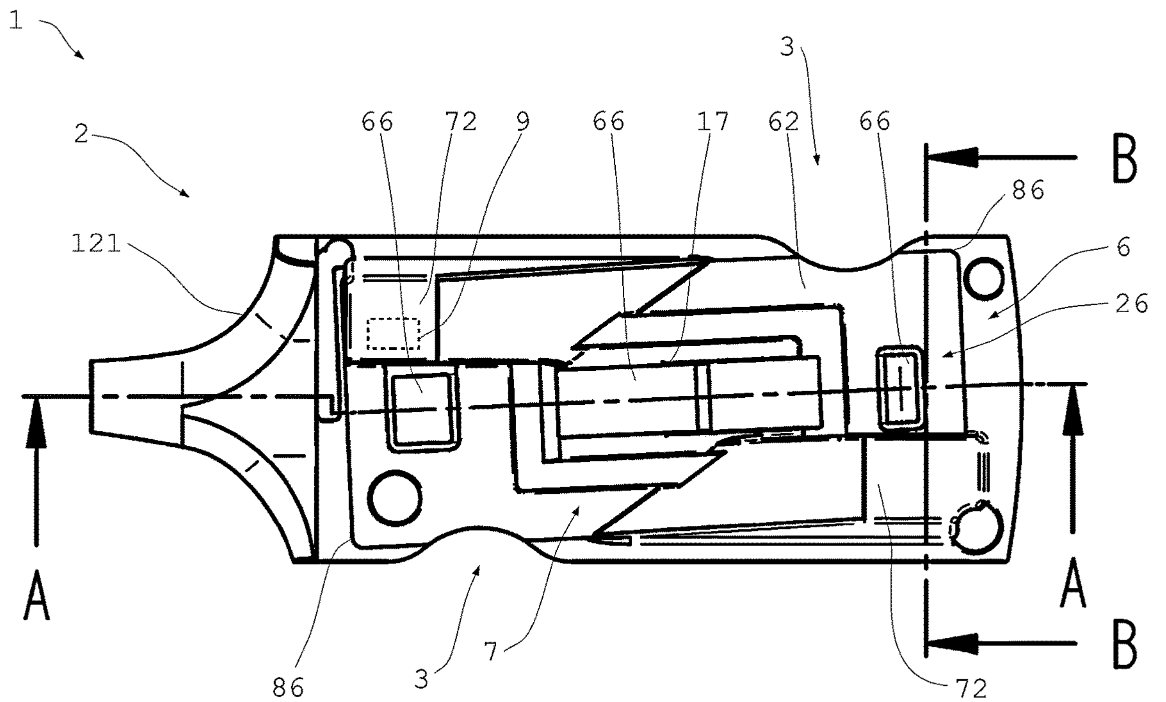
FIG. 3 is a schematic illustration of the blade head member in a view of the other side.

FIG. 3 shows the side of the blade head member 121 opposite the side face 22. On this side the adjusting device 6 for aligning the haircutting blade 4 and the coupling device 7 for attaching the second blade head member 122 and the take-up surfaces 62 for the haircutting blade 4 can be particularly clearly recognized.

A take-up surface 62 adjacent to each of the working sections 3 is provided against which the haircutting blade 4 rests when operational, making contact. One depression 72 each for reducing weight is worked into the blade head 2 in the direction of the longitudinal axis 42 next to the take-up surface 62.

The adjusting device 6 comprises an adjusting unit 26 at the blade head member 121 comprising three elevations 66 on this blade head member 121. The adjusting device 6 moreover comprises in the haircutting blade 4 a recess 16 described in more detail with reference to the FIG. 14. The elevations 66 engage the recess 16 so as to prohibit movement of the haircutting blade in its longitudinal direction and also transverse to its longitudinal direction.

The adjusting device 6 moreover comprises a take-up cavity 86 recessed in the blade head member 121 matched to the outer contour of the haircutting blade 4. The depth of the take-up cavity 86 corresponds at least approximately to the thickness of the haircutting blade 4.

The adjusting unit 26 is disposed at an angle or inclination to the longitudinal axis 42 of the blade head 2 with its three elevations 66. The take-up cavity 86 also shows an angular arrangement. Thus the inserted haircutting blade 4 is aligned by its cutting edges 14 at a defined angle to the longitudinal axis 42 respectively to the longitudinal faces 12 of the blade head 2. The angle of the inclined position is for example 3°.

Figure 9:
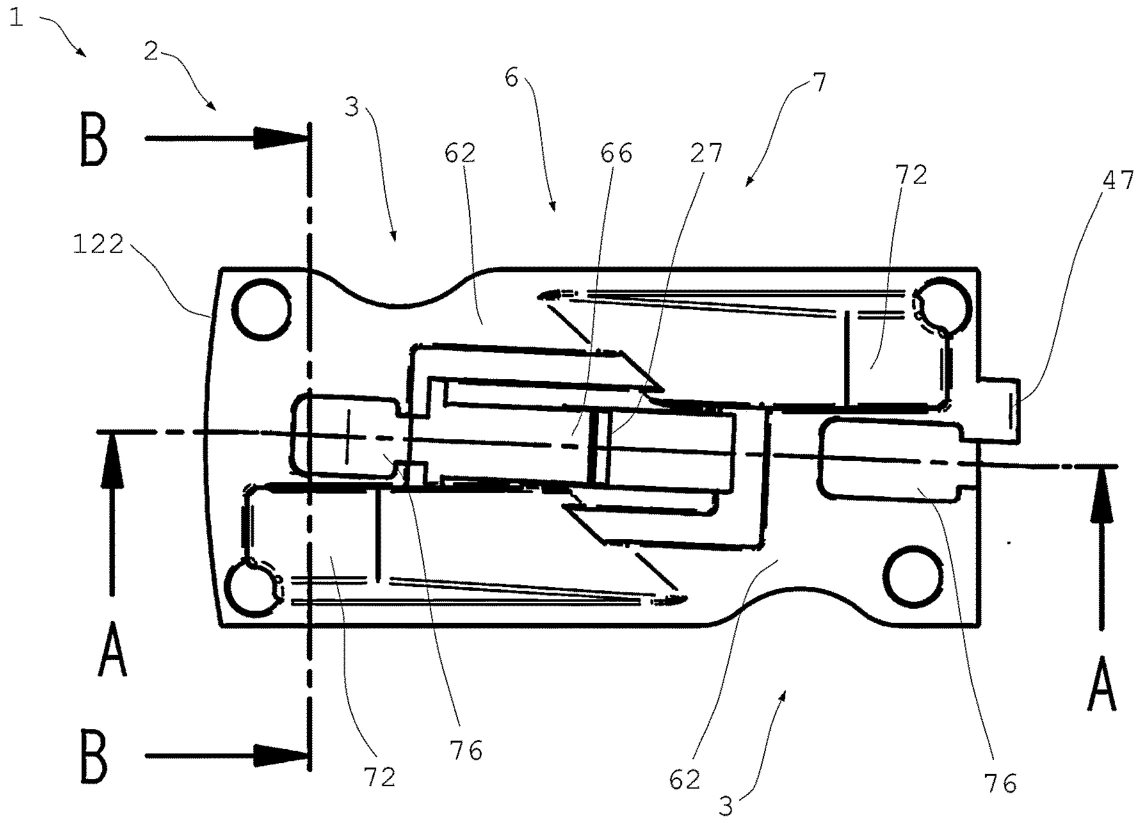
FIG. 9 is a schematic illustration of another blade head member in a view of the other side.

The coupling device 7 comprises a connecting lug 17 which can be wedged with a connecting lug 27 shown in the FIG. 9, of the other blade head member 122. To this end the connecting lugs 17, 27 show a wedge-shaped or conical design.

For clamping the haircutting blade 4 the cover 122 is pushed onto the first blade head member 121 in the longitudinal direction so that one of the connecting lugs 17 grasps beneath the other of the connecting lugs 27 and vice versa. The two blade head members 121, 122 are brought toward one another so as to firmly clamp the haircutting blade 4. Vibrations of the blade 4 during cutting can thus be effectively prevented.

The connecting lug 17 serves at the same time as the elevation 66 for the adjusting device 6. To this end the connecting lug 17 preferably has a width closely fitting the width of the recess 16 of the haircutting blade 4.

Figure 4:
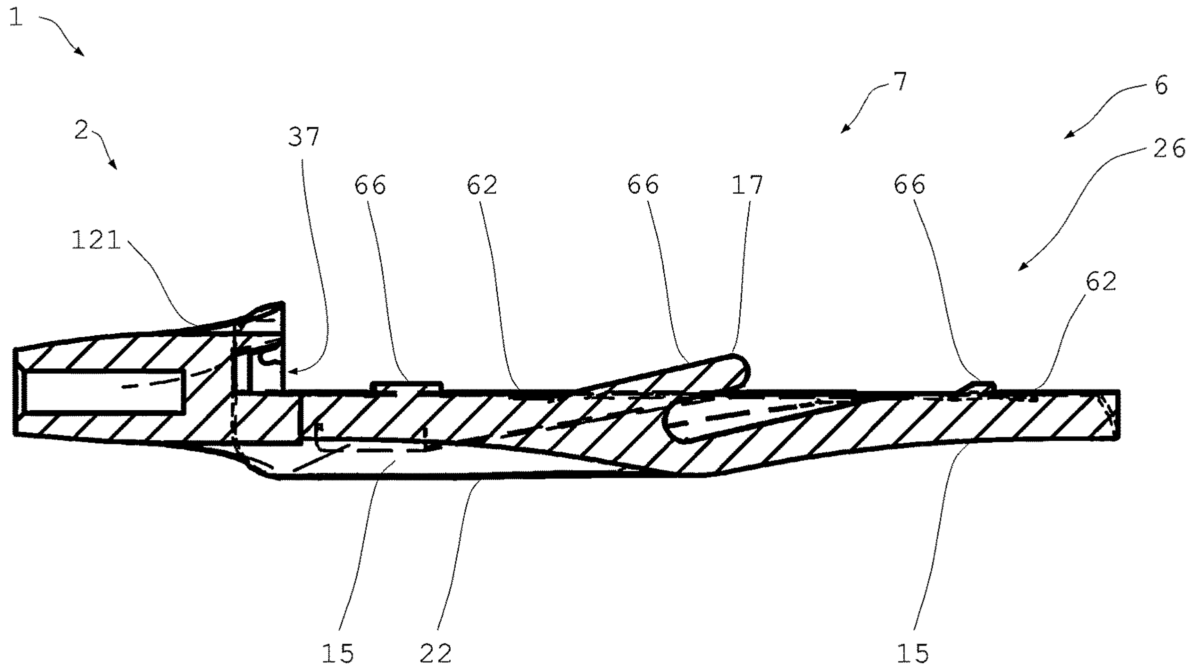
FIG. 4 is a schematic illustration of the blade head member in a sectional view on the cutting line A-A in FIG. 3.

FIG. 4 shows the first blade head member 121 in a sectional illustration on the line A-A of the FIG. 3. A cutout 37 of the coupling device 7 serves to accommodate a projection 47 of the second blade head member 122 shown in the FIG. 8. The projection 47 is inserted into the cutout 37 as the cover 122 is attached while the connecting lugs 17, 27 are wedged to one another.

The cutout 37 may be provided with a spring member, not shown in detail, prohibiting exit of the projection 47 from the cutout 37. To this end the spring member preferably engages an undercut provided in the projection 47.

Figure 5:
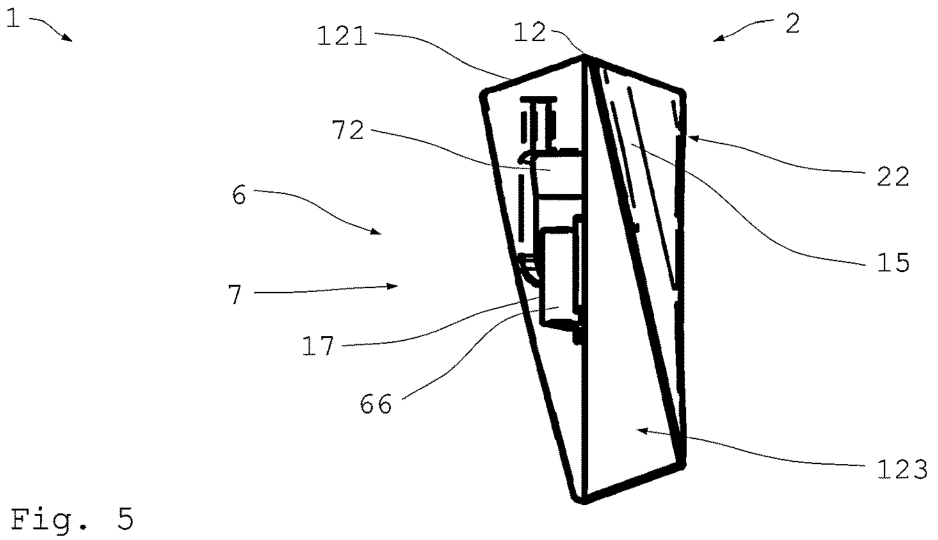
FIG. 5 is a schematic illustration of the blade head member in a front view.

FIG. 5 shows a front view of the blade head member 121 and a view of the side face 123.

Figure 6:
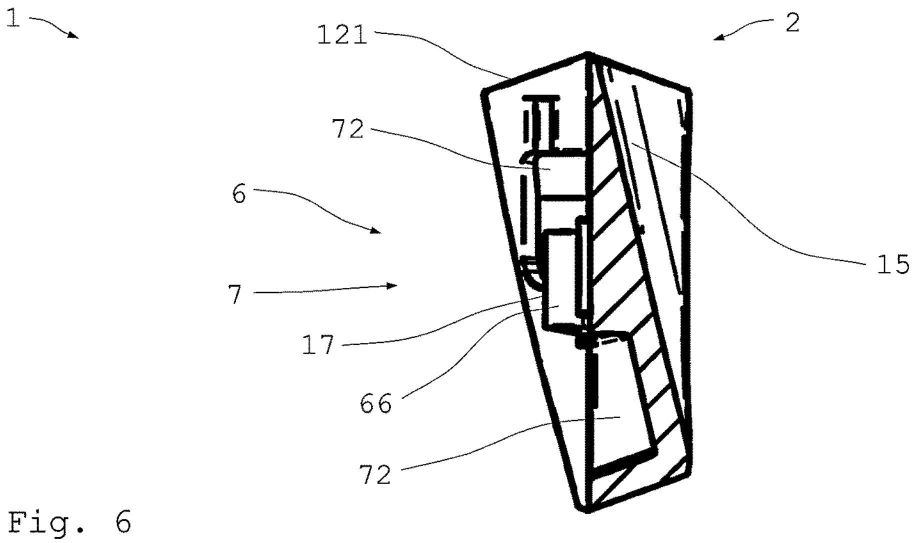
FIG. 6 is a schematic illustration of the blade head member in a sectional view on the cutting line B-B in FIG. 3.

FIG. 6 shows the blade head member 121 in a sectional illustration on the line B-B in FIG. 3.

Figure 7:
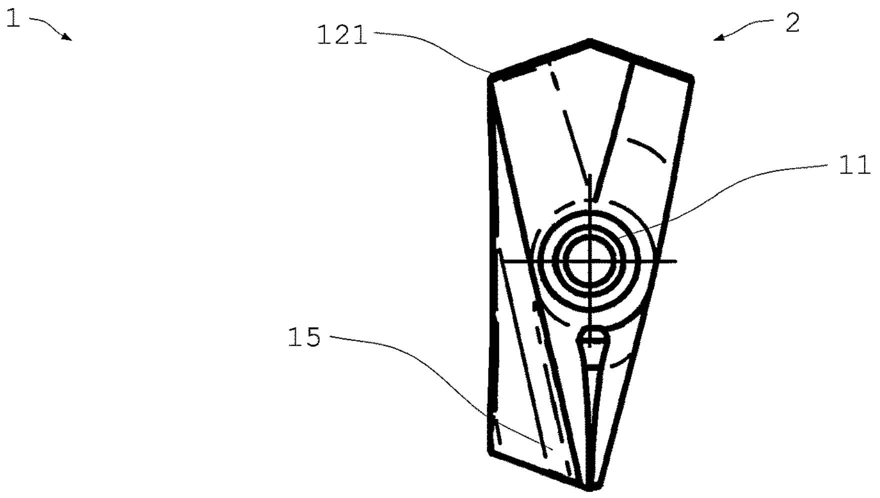
FIG. 7 is a schematic illustration of the blade head member in a rear view.

FIG. 7 shows the blade head member 121 in a rear view revealing the grip accommodation 11. This illustration shows particularly clearly that the longitudinal axis of the grip 10 extends in one plane with the haircutting blade 4 accommodated in the blade head 2.

Figure 8:
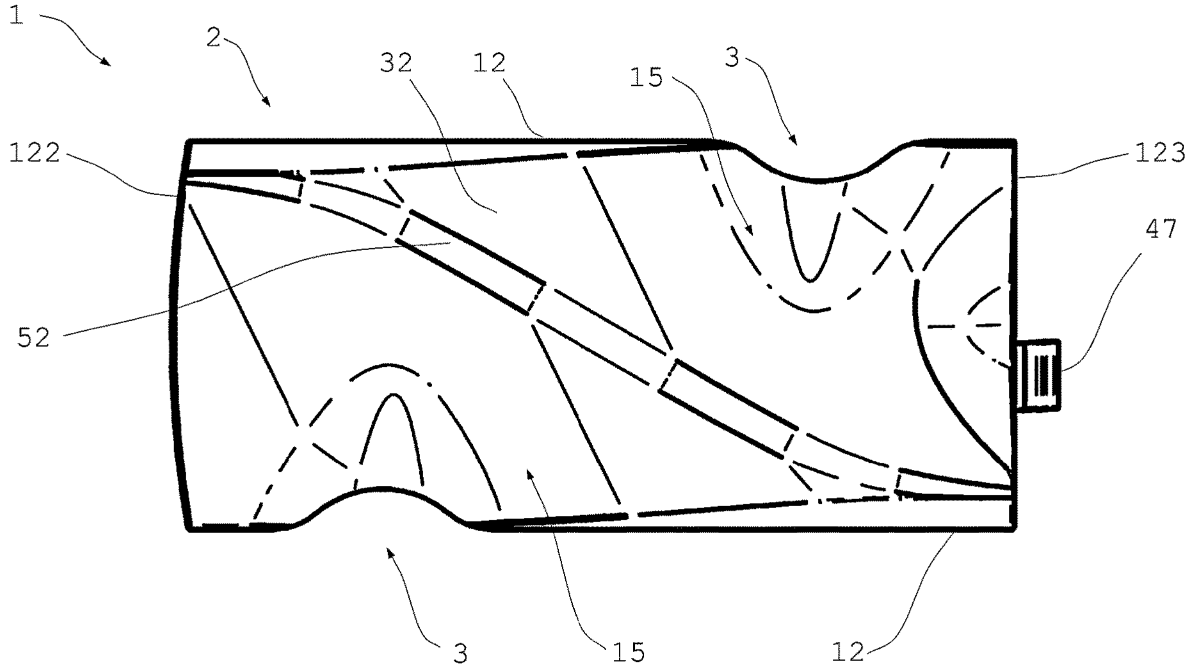
FIG. 8 is a schematic illustration of another blade head member of the haircutter in a view of a side face.

FIG. 8 shows the second blade head member 122 or the cover for the first blade head member 121 in a top view of the side face 32. The second blade head member 122 is configured in analogy to the first blade head member 121 and likewise comprises two opposite working sections 3 offset to one another so that the second blade head member 122 illustrates a kind of second side half of the first blade head member 121. The working sections 3 and the placing surfaces 15 are also configured in analogy to the first blade head member 121.

On the side face 123 the blade head member 122 shows a projection 47 that, as the two blade head members 121, 122 are brought together, is inserted into the cutout 37.

FIG. 9 shows the side of the blade head member 122 facing the haircutting blade 4. This blade head member 122 is again provided with take-up surfaces 62 for the haircutting blade 4 in the region of the working sections 3. In the longitudinal direction adjacent thereto and on the opposite longitudinal face 12, pertaining depressions 72 are provided in which the haircutting blade 4 is exposed. The blade head member 122 serving as a cover is not provided with a grip accommodation 11.

The connecting lug 27 of the coupling device 7 is configured in analogy to the connecting lug 17 of the other of the blade head members 121 and likewise serves as an elevation 66 for the adjusting device 6. The adjusting unit 6 of the second blade head member 122 comprises two adjusting recesses 76 in which the two outer elevations 66 of the first blade head member 121 engage when the two members 121, 122 are coupled to one another.

Figure 10:
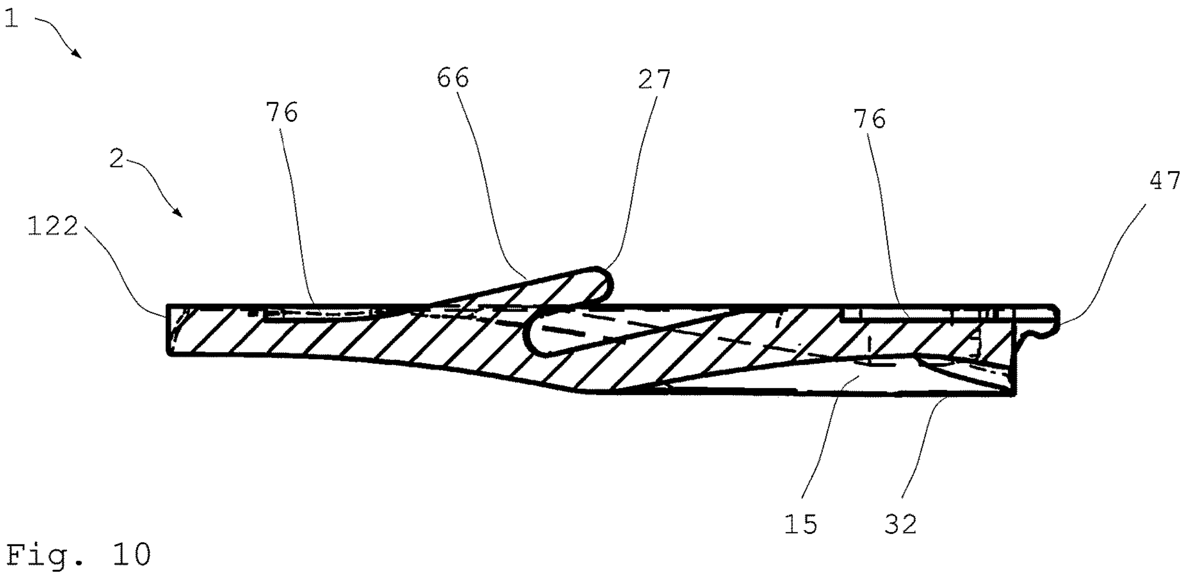
FIG. 10 is a schematic illustration of the blade head member in a sectional view on the cutting line A-A in FIG. 9.

FIG. 10 shows the blade head member 122 in a sectional illustration on the line A-A of FIG. 9. The connecting lug 27 corresponding to the connecting lug 17 of the first blade head member 121 and also the adjusting recesses 76 can be seen particularly clearly. One can particularly clearly also see the projection 47 that is configured with an undercut.

Figure 11:
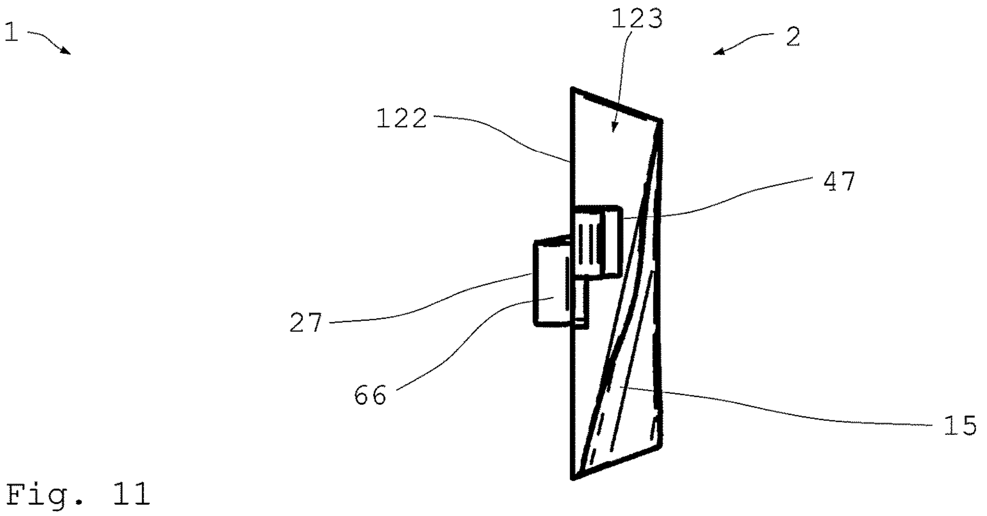
FIG. 11 is a schematic illustration of the blade head member in a rear view.

FIG. 11 shows the second blade head member 122 in a rear view with a view of the side face 123 with the projection 47.

Figure 12:
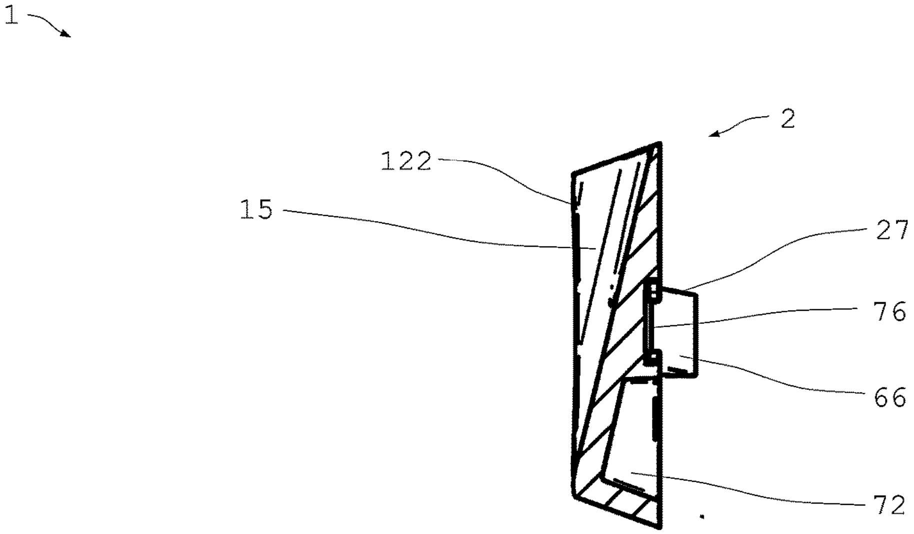
FIG. 12 is a schematic illustration of the blade head member in a sectional view on the cutting line B-B in FIG. 9.

FIG. 12 shows the second blade head member 122 in a sectional illustration on the line B-B of FIG. 9.

Figure 13:
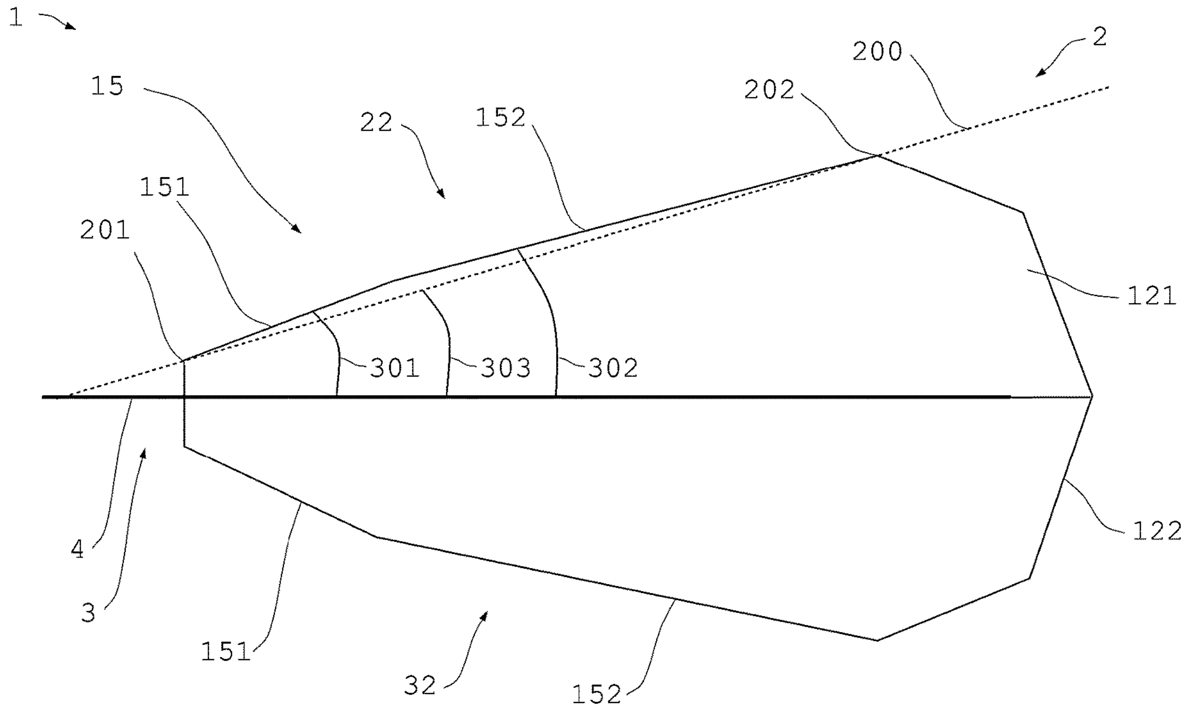
FIG. 13 is a simplistic illustration of a cross-section of a blade head.

FIG. 13 shows a simplistic illustration of a blade head 2 of the inventive haircutter 1 and a haircutting blade 4 accommodated therein. The cross-section of the blade head 2 is shown in the region of the maximum recess in the working section 3.

The two side faces 22, 32 of the blade head 2 are each configured with a first placing section 151 and a second placing section 152. Each of the side faces 22, 32 is provided by a blade head member 121, 122. The first placing section 151 is narrower in configuration than the second placing section 152.

The first placing section 151 extends at a larger angle 301 to the plane of the haircutting blade 4 than does the second placing section 152 that is disposed at an angle 302 to the plane of the haircutting blade 4. The first placing section 151 starts at a valley point 201 where the placing surface 15 or the first placing section 151 lies deepest above the haircutting blade 4. Also, the working section 3 is recessed deepest in the valley point 201 shown. The first placing section 151 then makes a transition to the second placing section 152. The second placing section 152 ends in a peak point 202 where the placing surface 15 or the 2nd placing section 152 is highest above the haircutting blade 4.

The first placing section 151 shows for example an angle 301 of 21°. The second placing section 152 shows for example an angle 302 of 15°.

In the configuration of the haircutter 1 shown the side faces 22, 32 are configured such that the pertaining valley point 201 has a particular relationship to the pertaining peak point 202. A line segment 200 extending at right angles to the longitudinal face 12 respectively to the alignment line 120 of the blade head 2 between the valley point 201 and the peak point 202 is disposed at a defined angle 303. The angle is for example 17°.

The three angles 301, 302, 303 result in a placing surface 15 allowing a particularly favorable cutting angle for the hair guided alongside and also allows a compact design of the blade head 2.

Figure 14:
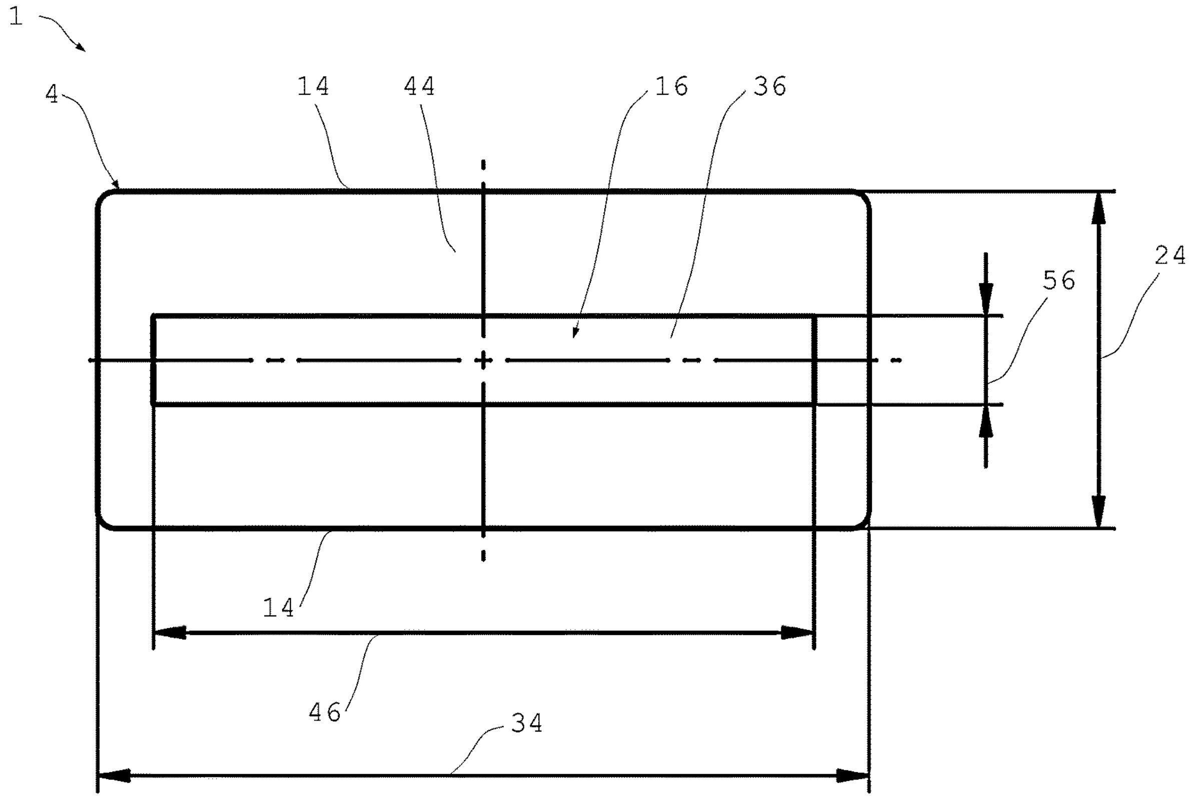
FIG. 14 is a simplistic illustration of a haircutting blade in a side view.

FIG. 14 shows a top view of the haircutting blade 4 according to the invention. The haircutting blade 4 is provided with two opposite cutting edges 14. This haircutting blade 4 is rectangular with rounded corners.

In the side face 44 of the haircutting blade 4 a recess 16 is formed that is configured as a rectangular, elongated hole 36. The elongated hole 36 shows rectangular or non-rounded corners. The length 46 of the elongated hole 36 corresponds to the distance of the two outer elevations 66 of the adjusting device 6 of the blade head 2. The width 56 of the recess 36 corresponds to the width of the adjusting unit 26 respectively the elevations 66 of the blade head 2.

The haircutting blade 4 shows a width 24 showing a ratio of 1:2.29 to the length 34. The width 24 is for example 19 mm. The length 34 is for example 43.5 mm. The thickness of the haircutting blade 4 is for example 0.1 mm. The width 24 of the recess (16) is 5 mm and the length (34) is 37.2 mm.

These dimensions of the haircutting blade 4 are particularly suitable for the haircutter 1 described above since they result in particularly advantageous angles for the placing surfaces 15 without making the blade head 2 bulky.

List of reference numerals:

| | |
|---|---|
| 1 | haircutter |
| 2 | blade head |
| 3 | working section |
| 4 | haircutting blade |
| 5 | guiding device |
| 6 | adjusting device |
| 7 | coupling device |
| 9 | counterweight |
| 10 | grip |
| 11 | grip accommodation |
| 12 | longitudinal face |
| 14 | cutting edge |
| 15 | placing surface |
| 16 | recess |
| 17 | connecting lug |
| 20 | balancing point |
| 22 | side face |
| 24 | width |
| 26 | adjusting unit |
| 27 | connecting lug |
| 32 | side face |
| 34 | length |
| 36 | elongated hole |

-continued

| List of reference numerals: | |
|---|---|
| 37 | cutout |
| 42 | longitudinal axis |
| 44 | side face |
| 46 | length |
| 47 | projection |
| 52 | elevation |
| 56 | width |
| 62 | take-up surface |
| 66 | elevation |
| 72 | depression |
| 76 | adjusting recess |
| 86 | take-up cavity |
| 120 | alignment line |
| 121 | blade head member |
| 122 | blade head member |
| 123 | side face |
| 151 | placing section |
| 152 | placing section |
| 153 | placing section |
| 200 | line segment |
| 201 | valley point |
| 202 | peak point |
| 301 | angle |
| 302 | angle |
| 303 | angle |

The invention claimed is:

1. Haircutter for trimming and styling hair, comprising:

a grip and a blade head with a haircutting blade defining a plane and having a first cutting edge in a fixed position in the blade head, the blade head being connected with the grip, the blade head comprising two blade head members adapted to interlock with each other and contain the haircutting blade between themselves, the blade head members each comprising a side face opposed to the side face of the other blade head member, the blade head members when interlocked defining a first longitudinal face at a juncture of edges of the blade head members, wherein the first longitudinal face intersects the plane of the haircutting blade adjacent the first cutting edge of the haircutting blade, the first longitudinal face of the blade head defining a first alignment line, the first longitudinal face having only one working section disposed thereat which is configured as a recess from the first alignment line of the longitudinal face and wherein the blade head members accommodate the haircutting blade so that the first cutting edge of the haircutting blade is at least partially exposed in the working section disposed in the first longitudinal face and does not protrude beyond the first alignment line, each of the side faces of the blade head members comprises a guiding device integrally formed in the side face of the blade head member, the guiding devices each having a first placing surface for the hair to be trimmed that comprises at least one first placing section and following behind and adjacent to the first placing section a second placing section transverse to a longitudinal axis of the blade head, and wherein the first placing section is disposed closer to the exposed cutting edge of the haircutting blade in the working section disposed in the first longitudinal face than is the second placing section, the first placing section being disposed adjacent to and surrounding at least a portion of the working section disposed in the first longitudinal face, the first and the second placing section each having an acute angle with respect to the plane of the haircutting blade, the first placing section has a larger acute angle with respect to the plane of the haircutting blade than does the second placing section and the first placing surface is at least partially disposed at an angle to the plane of the haircutting blade when the haircutting blade is oriented in the blade head so that the hair to be trimmed lies at a defined angle to the cutting edge as the first placing surface is placed against the hair.

2. The haircutter according to claim 1 wherein the first placing surfaces are at least partially disposed at an angle of substantially twenty-one degrees to the plane of the haircutting blade when the haircutting blade is accommodated in the blade head.

3. The haircutter according to claim 1 wherein each first placing surface and the corresponding blade head member are configured as one piece and wherein the first placing surface is provided by a wedge shape of the blade head.

4. The haircutter according to claim 1 wherein each first placing surface is provided by a curved shape of the blade head member.

5. The haircutter according to claim 1 wherein the haircutting blade further comprises a second cutting edge opposed and parallel to the first cutting edge, the blade head comprises a second longitudinal face opposite the first longitudinal face, the second longitudinal face defining a second alignment line, the second alignment line being parallel to the first alignment line, the second longitudinal face having only one working section disposed thereat which is configured as a recess from the second alignment line of the second longitudinal face, wherein the second cutting edge of the haircutting blade is at least partially exposed in the working section disposed in the second longitudinal face and does not protrude beyond the second alignment line, the side faces of the blade head members being disposed between the first longitudinal face and the second longitudinal face, the guiding devices of the side faces each further comprising a second placing surface, and wherein the second placing surface of each of the guiding devices is assigned to the working section disposed in the second longitudinal face.

6. The haircutter according to claim 1, comprising at least one adjusting unit in the blade head adapted to at least partially engage at least one recess in a haircutting blade when a haircutting blade having at least one recess configured as an elongated hole extending in the longitudinal direction of the haircutting blade and having an outer contour is accommodated in the blade head so as to prohibit movement of the haircutting blade at least in the longitudinal direction and/or at least transverse to the longitudinal direction.

7. The haircutter according to claim 6 wherein the adjusting unit is adapted to at least partially engage the at least one recess in the haircutting blade when the at least one recess in the haircutting blade is rectangular in shape and the haircutting blade is accommodated in the blade head.

8. The haircutter according to claim 6 wherein the adjusting device comprises at least one take-up cavity disposed in the blade head and adapted to track at least portions of an outer contour of the haircutting blade when the haircutting blade is accommodated in the blade head.

9. The haircutter according to claim 7 wherein the adjusting unit is adapted to at least partially engage the at least the one elongated hole in the haircutting blade when the haircutting blade is accommodated in the blade head and wherein the elongated hole in the haircutting blade has a length of more than two thirds of the length of the haircutting blade.

10. The haircutter according to claim 7 wherein the adjusting unit is adapted to at least partially engage the at least one elongated hole in the haircutting blade when the haircutting blade is accommodated in the blade head and wherein the elongated hole in the haircutting blade has a width of less than one third of the width of the haircutting blade.

11. The haircutter according to claim 6 wherein the adjusting unit comprises at least three elevations wherein at least two elevations are adapted to be disposed at the ends of the at least one elongated hole in the haircutting blade when the haircutting blade is accommodated in the blade head and at least one elevation is in-between the at least two elevations.

12. The haircutter according to claim 6 wherein the adjusting unit is disposed at such an angle to a longitudinal axis of the blade head wherein the cutting edge of the haircutting blade is disposed at an angle between one-half of a degree and six degrees to the longitudinal axis of the blade head.

13. The haircutter according to claim 1 wherein a line segment extending orthogonally to an alignment line of the longitudinal face shows an angle of twelve degrees to twenty-three degrees to the plane of the haircutting blade between a valley point in which the working section is recessed furthest and where the placing surface lies closest to the haircutting blade, and a peak point in which the placing surface lies highest above the haircutting blade.

14. The haircutter according to claim 1 wherein a line segment extending orthogonally to an alignment line of the longitudinal face shows an angle of sixteen degrees to eighteen degrees to the plane of the haircutting blade between a valley point in which the working section is recessed furthest and where the placing surface lies closest to the haircutting blade, and a peak point in which the placing surface lies highest above the haircutting blade.

15. The haircutter according to claim 13 wherein the placing surface at least partially shows an angle of twelve degrees to thirty degrees to the plane of the haircutting blade between the valley point and the peak point.

16. The haircutter according to claim 13 wherein the placing surface at least partially shows an angle of twenty degrees to twenty-two degrees to the plane of the haircutting blade between the valley point and the peak point.

17. The haircutter according to claim 1 wherein the first placing section has an angle of nineteen degrees to twenty-three degrees.

18. The haircutter according to claim 1 wherein the second placing section shows an angle of twelve degrees to fifteen degrees.

19. The haircutter according to claim 1 wherein the first placing section extends over less than half the width of the placing surface.

20. The haircutter according to claim 1 wherein the second placing section extends over more than half the width of the placing surface.

21. The haircutter according to claim 1 wherein the first placing section has a concave dome-like shape.

22. The haircutter according to claim 1 wherein the blade head comprises on at least on one side of the blade head at least one third placing section next to and extending along a longitudinal direction parallel to the longitudinal axis of the blade head away from the working section.

23. The haircutter according to claim 1 wherein the blade head comprises at least one take-up surface adapted to bear against more than one fourth of at least one side face of the haircutting blade.

24. The haircutter according to claim 1 wherein the blade head comprises at least one take-up surface adapted to bear against a side face of the haircutting blade in a multitude of contact points.

25. The haircutter according to claim 1 wherein the blade head has at least one depression which is recessed relative to at least one of the side faces of the haircutting blade so as to expose the haircutting blade.

26. The haircutter according to claim 25 wherein the take-up surface is disposed adjacent to the working section and wherein the depression is disposed spaced-apart from the working section.

27. The haircutter according to claim 1 wherein a longitudinal axis of the grip is adapted to extend on one plane with the haircutting blade.

28. The haircutter according to claim 1 wherein the grip and the blade head are adapted to have at least one shared balancing point located in the grip.

29. The haircutter according to claim 1 wherein the grip is adapted to accommodate at least one counterweight.

30. The haircutter according to claim 1 wherein the blade head is adapted to accommodate at least one counterweight.

31. The haircutter according to claim 1 wherein the first placing section is at least partially disposed at an angle of between sixteen degrees and twenty-six degrees to the plane of the haircutting blade when the haircutting blade is accommodated in the blade head.

32. The haircutter according to claim 5 wherein the working sections disposed in the first and the second longitudinal faces are offset with respect to each other on the blade head.

33. Haircutter for trimming and styling hair, comprising:

at least one grip and at least one blade head with a haircutting blade defining a plane and having at least one cutting edge in a fixed position in the blade head, the blade head being connected with the grip, at least one longitudinal face of the blade head defining an alignment line, the longitudinal face having at least one working section disposed thereat which is recessed from the alignment line of the longitudinal face and wherein the blade head accommodating the haircutting blade so that the cutting edge of the haircutting blade is at least partially exposed in the working section and does not protrude beyond the alignment line, the blade head comprises at least one guiding device having at least one placing surface for the hair to be trimmed that comprises at least one first placing section and following behind and adjacent to the first placing section at least one second placing section transverse to a longitudinal axis of the blade head and wherein the first placing section is disposed closer to the exposed cutting edge of the haircutting blade than is the second placing section, the first placing section being disposed adjacent to and surrounding at least a portion of the working section, the first and the second placing section each having an acute angle with respect to the plane of the haircutting blade, the first placing section has a larger acute angle with respect to the plane of the haircutting blade than does the second placing section and the placing surface is at least partially disposed at an angle to the plane of the haircutting blade when the haircutting blade is oriented in the blade head so that the hair to be trimmed lies at a defined angle to the cutting edge as the placing surface is placed against the hair, wherein the blade head comprises on at least on one side of the blade head at least one third placing section next to and extending along a longitudinal direction parallel to the longitudinal axis of the blade head away from the working section, and wherein the blade head comprises, on the at least one side of the blade head, an elevation in the blade head extending substantially in a diagonal, and the at least one third placing section on the at least one side of the blade head extends between the elevation and a section of the longitudinal face of the blade head.

34. The haircutter according to claim 33 wherein the at least one third placing section extends between the elevation and a section of the longitudinal face of the blade head that shows increasing thickness.

* * * * *